United States Patent
Valtersson

(10) Patent No.: US 12,077,170 B2
(45) Date of Patent: Sep. 3, 2024

(54) METHOD FOR CONTROLLING A REMOTELY OPERATED VEHICLE

(71) Applicant: EINRIDE AB, Stockholm (SE)

(72) Inventor: Edvin Valtersson, Sävedalen (SE)

(73) Assignee: Einride Autonomous Technologies AB, Stockholm (SE)

(*) Notice: Subject to any disclaimer, the term of this patent is extended or adjusted under 35 U.S.C. 154(b) by 0 days.

(21) Appl. No.: 18/105,901

(22) Filed: Feb. 6, 2023

(65) Prior Publication Data

US 2023/0249701 A1    Aug. 10, 2023

(30) Foreign Application Priority Data

Feb. 8, 2022    (SE) .................................... 2250118-3

(51) Int. Cl.
| | |
|---|---|
| *G05D 1/02* | (2020.01) |
| *B60W 50/035* | (2012.01) |
| *B60W 50/04* | (2006.01) |
| *G05D 1/00* | (2006.01) |

(52) U.S. Cl.
CPC ........ *B60W 50/035* (2013.01); *B60W 50/045* (2013.01); *G05D 1/0022* (2013.01)

(58) Field of Classification Search
CPC .............. B60W 50/035; B60W 50/045; G05D 1/0022; G05D 1/0016; G05D 1/0055; G08C 17/02; H04W 4/44
See application file for complete search history.

(56) References Cited

U.S. PATENT DOCUMENTS

| | | | |
|---|---|---|---|
| 10,908,604 B2* | 2/2021 | Rastoll ................. | G05D 1/0044 |
| 11,292,480 B2* | 4/2022 | Wang ................ | B60W 60/0015 |
| 2020/0041994 A1* | 2/2020 | Alalao ..................... | H04W 4/38 |
| 2020/0192352 A1* | 6/2020 | Rastoll ................. | G05D 1/0044 |
| 2020/0201319 A1* | 6/2020 | Gross .................. | B60W 60/007 |

FOREIGN PATENT DOCUMENTS

CN         112000106 A       11/2020

OTHER PUBLICATIONS

Search report from the Swedish Patent Office for the priority application 2250118-3, report dated Sep. 9, 2022.

* cited by examiner

*Primary Examiner* — Masud Ahmed
(74) *Attorney, Agent, or Firm* — AWA Sweden AB; Thomas L. Ewing

(57) ABSTRACT

Embodiments of the invention pertain to a method of controlling a remotely operated vehicle operated from a remote operation station via a communication link, the method comprising: monitoring a latency (L) of the communication link, requesting (S2) an emergency stop maneuver in response to the latency exceeding a predetermined threshold (T), and cancelling (S3) the requested emergency stop maneuver, in response to the communication link being recovered within a brake reaction time (A). Embodiments of the invention also relate to a remotely operated vehicle having a control unit configured to: monitor a latency (L) of a communication link between the vehicle and a remote operation station, request an emergency stop maneuver in response to the latency exceeding a predetermined threshold (T), and cancel the requested emergency stop maneuver, in response to the communication link being recovered within a brake reaction time period (A).

20 Claims, 4 Drawing Sheets

METHOD FOR CONTROLLING A REMOTELY OPERATED VEHICLE

CROSS-REFERENCE TO RELATED APPLICATION

This application claims priority from Swedish Patent Application 2250118-3, titled "Method for Controlling a Remotely Operated Vehicle," filed on 8 Feb. 2022. The entire contents of this priority application is incorporated herein by reference.

FIELD

Embodiments of the invention relate to a method for controlling a remotely operated vehicle, as well as to such a remotely operated vehicle.

BACKGROUND

The low latency of the communication link between a remotely operated vehicle and the remote operation station is a key enabling factor for remote driving or monitoring. Safe operation of the vehicle requires that the latency is low enough to allow the remote operator to perceive and react to what is happening in the surrounding of the vehicle in real time. Contributing factors to the total latency of the system include communication delays, video processing delays, and mechanical delays.

A critical safety feature of remotely driven or monitored vehicles is the ability to perform an emergency stop, should the operator for example identify a problem with the steering of the vehicle. A maximum communications latency threshold for operating the vehicle is typically set to ensure that the vehicle can perform an emergency stop within a certain maximum distance. Above this threshold, remote driving of the vehicle may not be allowed. For example, CN 112000106 A discloses disabling remote driving and performing vehicle braking in response to the vehicle speed and network delay both being above respective thresholds.

In wireless communication links, such as cellular networks, used for remote driving, interruptions due, for example, to lost packets causing retransmission or cell tower handover, occur regularly. Latencies for an LTE cellular link are commonly around 80 to 100 ms, while latency spikes of 300 ms are not uncommon. Therefore, the maximum communications latency threshold for operating the vehicle is normally set above this range of commonly occurring latency to avoid too frequent interruption of the operation of the vehicle. In turn this may limit the maximum speed at which the vehicle can be allowed to operate, to ensure that an emergency stop can be performed within the maximum distance.

SUMMARY OF THE INVENTION

Embodiments of the invention alleviate at least some of the above-mentioned drawbacks and attempt to provide a more effective and safe method of controlling a remotely operated vehicle.

Embodiments of the invention may be defined by the appended independent claims, with embodiments also set forth in the appended dependent claims, in the following description, and in the drawings.

Embodiments of the invention provide a method of controlling a remotely operated vehicle, the vehicle being operated from a remote operation station via a communication link between the vehicle and the remote operation station, the method comprising: monitoring a latency of the communication link, requesting an emergency stop maneuver of the vehicle, in response to the latency exceeding a predetermined threshold, and cancelling the requested emergency stop maneuver, in response to the communication link being recovered within a brake reaction time period starting when the emergency stop maneuver is requested.

Some embodiments of the invention are at least partly based on the realization that commonly observed brake reaction times are in the same order of magnitude as common latencies of the communication link. By ensuring that a requested emergency stop maneuver is cancelled, should the communication link be recovered within a time period corresponding to the brake reaction time, the latency threshold can be set lower, without increasing the number of performed emergency stops. In other words, the latency threshold can be set low, within the range of common latencies, without causing frequent interruptions in the operation of the vehicle.

Moreover, in some embodiments of the invention when the communication link is not recovered, the lower latency threshold means that the brakes are engaged earlier than with a higher latency threshold. This may create an additional margin for stopping the vehicle in the emergency brake maneuver, which can be used to increase the maximum allowed speed of the vehicle without increasing the stopping distance of the emergency brake maneuver.

According to an embodiment of the invention, the predetermined threshold may be dynamic, such that the predetermined threshold can vary depending on a current driving scenario.

In some embodiments, the latency threshold may be set depending on external parameters such the traffic environment, current visibility conditions, etc. Such a driving scenario may encompass the current traffic environment, the current weather conditions, the current visibility conditions, the type of cargo transported by the vehicle, and/or the type of road driven on, for example, an open road or private fenced area. Setting the latency threshold may be done automatically by the vehicle or manually by a remote operator. It may additionally or alternatively be set by a fleet manager or a fleet management system if the vehicle is part of a fleet of vehicles. The latency threshold may be set for a particular trip, or may be changed during a trip, for example in response to changing traffic environment or visibility conditions.

Alternatively, the latency threshold may be static, i.e., fixed for the vehicle being operated. For example, it may be set as a predetermined vehicle parameter from the factory. Additionally, or alternatively, the latency threshold may be later updated, for example as part as a software update of the vehicle.

According to an embodiment of the invention, the requested emergency stop maneuver is cancelled before the vehicle starts decelerating.

This ensures continuous operation of the vehicle without any adverse effects due to normal fluctuations of the communication link. No sudden movement is experienced in the vehicle, avoiding possible risks for cargo transported by the vehicle and improving the comfort of any passengers present in the vehicle. Additionally, it avoids an unpredictable movement of the vehicle that could surprise drivers of other vehicles present in the surroundings, which improves the safety of the vehicle.

According to an embodiment, the brake reaction time period corresponds to a delay between the moment the emergency stop maneuver is requested and the moment a brake system of the vehicle start slowing the vehicle down. For example, in air or pneumatic brake systems, which are used for most heavy-duty trucks, the delay is related to the time required for sufficient pressure to build up for the brake to engage. The brake reaction time period is generally static for a vehicle but can differ between different vehicles and brake systems.

According to an embodiment, the method further comprises continuing the requested emergency stop maneuver, in response to the communication link not being recovered within the brake reaction time period. This may provide a safer course of action. If the communication link is not recovered, there is no guarantee that a remote operator of the vehicle has control over the vehicle.

According to an embodiment, the requested emergency stop maneuver continues to stop the vehicle until the vehicles is stationary. Stopping the vehicle in its lane may be the safest option.

According to an embodiment, the method further comprises: cancelling the requested emergency stop maneuver, in response to the communication link being recovered within a second time period following the brake reaction time period, wherein the second time period corresponds to a delay between the moment a brake system of the vehicle starts slowing the vehicle down and the moment the brake system reaches full braking power. This may allow the vehicle to be operated with fewer interruptions in the presence of if higher latency peaks in the communication link. The requested emergency stop maneuver being cancelled only after the moment the brake system of the vehicle starts slowing the vehicle means that a deceleration will be felt, at least to some extent, by passengers or cargo present in the vehicle. On the other hand, the requested emergency stop maneuver is more likely to be cancelled, i.e., operation of the vehicle is more likely to be continued without performing a full emergency stop maneuver. In other words, a trade-off can be chosen between comfort of the passengers/safety of the cargo and continuity of operation of the vehicle.

In some embodiments of the invention, full braking power means that the maximum air pressure has been achieved in the air brake system and/or that the maximum deceleration of the vehicle has been achieved.

According to an embodiment, the predetermined threshold is in the range of 100-1000 ms, such as about 200 ms. This allows the vehicle to be effectively operated with communication links exhibiting a wide range of latencies.

According to an embodiment, the brake reaction time period is in the range of 150-250 ms, such as about 200 ms.

According to an embodiment, requesting an emergency stop maneuver includes a control unit of the vehicle sending a request for an emergency stop maneuver to a brake system of the vehicle.

The request for an emergency stop maneuver is thus made from within the vehicle, independently of the remote operation station. The communication between the control unit of the vehicle sending a request for an emergency stop maneuver and the brake system is not affected by the latency of the communication link between the vehicle and the remote operation station.

According to an embodiment, the communication link is recovered when the latency falls below the predetermined threshold.

In other words, monitoring a latency of the communication link may comprise determining if the latency is above the predetermined threshold or below the predetermined threshold. The latency being above the predetermined threshold indicates at least an interruption of the communication link long enough that it cannot be guaranteed that the remote operator has control over the vehicle. The latency subsequently falling below the predetermined threshold indicates that interruptions of the communication link are short enough to consider operation of the vehicle safe.

According to an embodiment, wherein the communication link is wireless, wherein the latency is round-trip latency, and/or wherein the latency is continuously monitored in the vehicle.

The communication link may be through a cellular network, such as e.g., an LTE or 5G network. The communication link may alternatively be through Wi-Fi or radio. The latency may be based on the age of the last acknowledged packet.

According to an embodiment, the steps of monitoring a latency of the communication link, requesting an emergency stop maneuver of the vehicle, cancelling the requested emergency stop maneuver, and optionally continuing the requested emergency stop maneuver are performed by the vehicle.

Thus, in at least one embodiment of the invention, the method may be performed by the vehicle, independently of the remote operation station. This ensures that the steps of the method can be performed even when the communication link between the vehicle and the remote operation station is interrupted or lost.

According to an embodiment, the vehicle is at least one of: capable of autonomous driving and remote driving, capable of fully electric propulsion, and a road vehicle.

According to an embodiment, operating the vehicle from a remote operation station includes at least one of: an operator of the remote operation station remotely driving the vehicle and an operator of the remote operation station remotely monitoring the vehicle.

A remotely operated vehicle may at certain times be remotely driven and at other times be remotely monitored. One trip of a remotely operated vehicle may include segments in which the vehicle is remotely driven, segments in which the vehicle is remotely monitored, or a combination thereof. The predetermined latency threshold may be the same when the vehicle is remotely driven and when the vehicle is remotely monitored. Alternatively, the predetermined latency threshold may be different when the vehicle is remotely driven and when the vehicle is remotely monitored.

According to some embodiments of the invention, there is provided a remotely operated vehicle configured to be operated from a remote operation station via a communication link between the vehicle and the remote operation station, the vehicle having a control unit comprising at least one processor, which control unit is configured to: monitor a latency of the communication link, request an emergency stop maneuver, in response to the latency exceeding a threshold, and cancel the requested emergency stop maneuver, in response to the communication link being recovered within a brake reaction time period starting when the emergency stop maneuver is requested.

The remotely operated vehicle may be suitable for control by a method for controlling a remotely operated vehicle as described in connection hereinbelow. It should be understood that steps and embodiments of various embodiments of the invention may, as far as is compatible with the remotely operated vehicle, be implemented in the remotely operated vehicle according as described hereinbelow, and vice versa. The advantages described in connection to a specific embodiment of the invention may apply to the remotely operated vehicle in various embodiments of the invention.

BRIEF DESCRIPTION OF THE DRAWINGS

Embodiments of the invention will now be described in more detail with reference to the appended drawings. Figures provided herein may or may not be provided to scale. The relative dimensions or proportions may vary. Embodiments of the invention may be sized to fit within a variety of devices and larger systems.

DETAILED DESCRIPTION OF AN EMBODIMENT OF THE INVENTION

Figure 1:
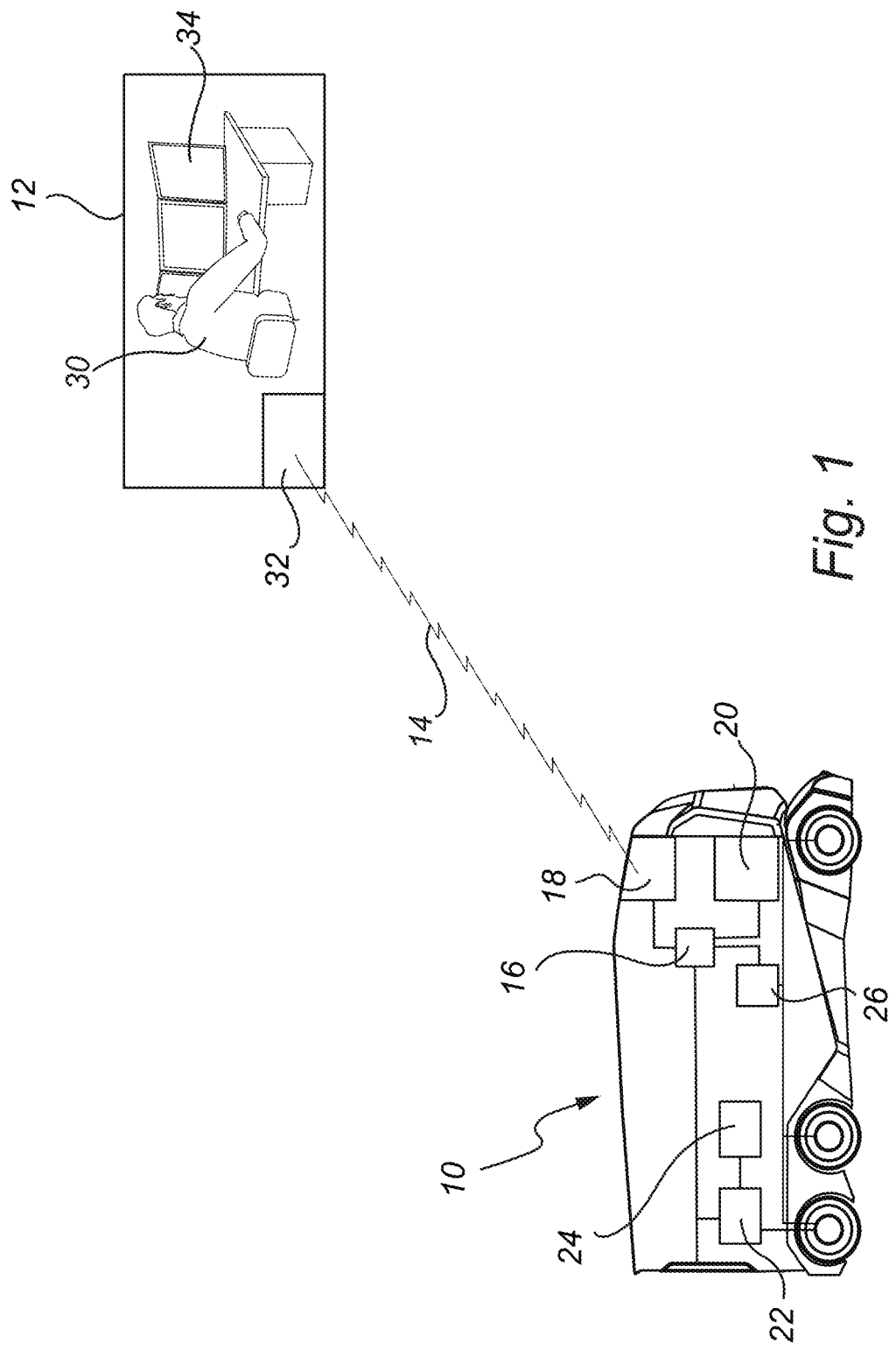
FIG. 1 schematically illustrates a remote operation station and a remotely operated vehicle.

Embodiments of the invention will now be described with reference to the accompanying drawings. The invention may, however, be embodied in many different forms and should not be construed as limited to the embodiments set forth herein. Even though in the following description, numerous details are set forth to provide a more thorough understanding of the present invention, it will be apparent to one of ordinary skill in the art that the present invention may be practiced in different embodiments. In other instances, well known constructions or functions are not described in detail, so as not to obscure the present invention. The terminology used in the detailed description of the particular embodiments illustrated in the accompanying drawings is not intended to be limiting of the invention. In the drawings, like numbers refer to like elements.

FIG. 1 illustrates a remotely operated vehicle 10 which is operated from a remote operation station 12 via a wireless communication link 14 (e.g., LTE, 5G, radio, Wi-Fi). Remotely operating the remotely operated vehicle 10 may comprise remotely driving the remotely operated vehicle 10, wherein a human teleoperator 30 remotely drives the remotely operated vehicle 10 from the remote operation station 12, and/or remotely monitoring the remotely operated vehicle 10, wherein a (human) teleoperator 30 remotely monitors and/or confirms otherwise autonomous driving of the remotely operated vehicle 10. Accordingly, the vehicle 10 may also be capable of autonomous driving. As such, the vehicle 10 could be denoted an autonomous/remotely operated vehicle 10.

The remotely operated vehicle 10 has at least one control unit 16, and wireless communication means 18 to communicate with the remote operation station 12 via the wireless communication link 14. Various sensors 20 may detect surroundings of the remotely operated vehicle 10. The remotely operated vehicle 10 may be an all-electric vehicle, propelled by at least one electric motor 22 powered by a battery 24. The remotely operated vehicle 10 also comprises a brake system 26, which may be, for example, an air or pneumatic brake system. Furthermore, the remotely operated vehicle 10 may be a transport vehicle, such as a box truck or a tractor trailer combination, for transporting pallets, timber, perishable goods, etc. (not shown in FIG. 1). Alternatively, the remotely operated vehicle 10 may be a passenger vehicle, a bus, mini-bus or similar. The remotely operated vehicle 10 may also be devoid of driver's cab or driver's seat, such that it cannot be driven manually by a driver in the vehicle 10. As noted above, the control unit 16 includes at least one processor.

The remote operation station 12 comprises wireless communication means 32 for communication with the remotely operated vehicle 10 via the wireless communication link 14, as well as equipment 34 for remotely operating the vehicle 10. The equipment can comprise, for example, at least one screen for displaying the surroundings of the remotely operated vehicle 10 as detected by the sensors 20, a steering wheel, throttle, braking means, etc.

Figure 2:
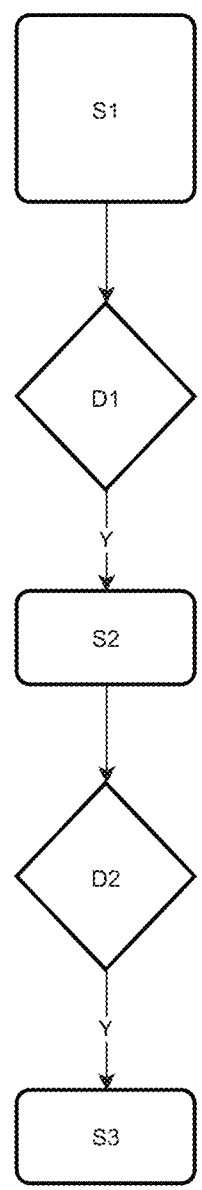
FIG. 2 is a flow chart of a method according to an exemplary embodiment of the present invention.

One exemplary embodiment of a method for controlling a remotely operated vehicle (e.g., remotely operated vehicle 10) according to the present disclosure is illustrated in the flow chart of FIG. 2. Step S1 consists in monitoring a (round-trip) latency of the communication link 14 between the remotely operated vehicle 10 and the remote operation station 12. In one alternative, monitoring the latency is performed by a control unit of the vehicle 10, e.g., control unit 16. This step may advantageously be performed continuously and in parallel with subsequent steps of the method. If the latency exceeds a predetermined threshold (step D1), a request for an emergency stop maneuver is made in step S2. Typically, this comprises a control unit of the vehicle 10, e.g., control unit 16, sending a request for an emergency stop maneuver to a brake system of the vehicle 10, e.g., brake system 26.

The latency threshold may be set in the range of 100 1000 ms, such as about 200 ms. This range is appropriate when the communication link 14 between the remotely operated vehicle 10 and the remote operation station 12 is an LTE cellular link, for instance, which commonly has latencies around 80-100 ms, with latency peaks of approximately 300 ms. The ordinarily skilled person realizes that other thresholds may be appropriate for other types of communication links.

It should be noted that the remotely operated vehicle 10 does not start decelerating instantly when the request for an emergency stop maneuver is made. For example, in vehicles using air brake systems, sufficient air pressure has to build up in the system before the brakes can engage, causing a delay between the request and the start of the braking action. According to the example embodiment of FIG. 2, if the communication link is recovered within this brake reaction time period (step D2), the requested emergency stop maneuver is cancelled in step S3. Operation of the vehicle 10 may then continue according to the method, i.e., the vehicle 10 keeps or resumes monitoring the latency of the communication link (step S1) and requests another emergency stop maneuver (step S2) in response to the latency exceeding the predetermined threshold (step D1), etc.

Figure 4A:
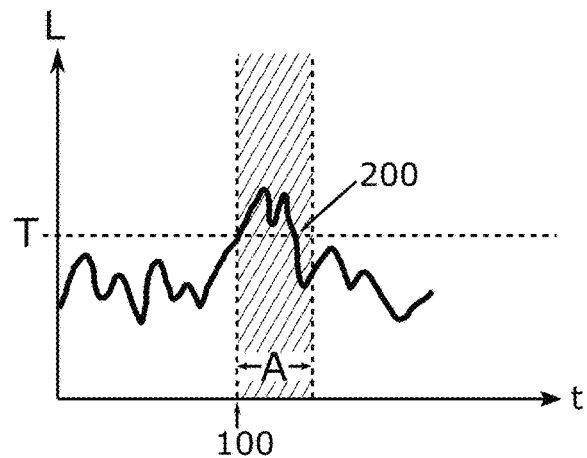
FIGS. 4a-d are schematic example plots of latency as a function of time in different scenarios.

The embodiment of FIG. 2 is exemplified in FIG. 4a, which shows an example plot of the latency L of the communication link 14 between the remotely operated vehicle 10 and the remote operation station 12 as a function of time t. The predetermined threshold T is marked by a horizontal dashed line. In the first part of the plot, to the left of arrow 100, the latency fluctuates but stays under the threshold T. At the moment indicated by arrow 100, the latency rises above the threshold T, corresponding to step D1 of FIG. 2. For the purpose of operating the remotely operated vehicle 10, the communication link 14 between the vehicle 10 and the remote operation station 12 is considered lost. As a result, an emergency stop maneuver is requested according to step S2. A brake reaction time period A starting when the emergency stop maneuver is requested is marked by the hatched area between two vertical dashed lines. Here, the latency L falls back below the threshold T within this brake reaction time period, as in step D2, i.e., the plot of the latency L crossed the horizontal dashed line at the moment indicated by arrow 200. In other words, the communication link 14 between the remotely operated vehicle 10 and the remote operation station 12 is recovered within the brake reaction time period A starting when the emergency stop maneuver is requested. As a result, the requested emergency stop maneuver is cancelled according to step S3.

Figure 3:
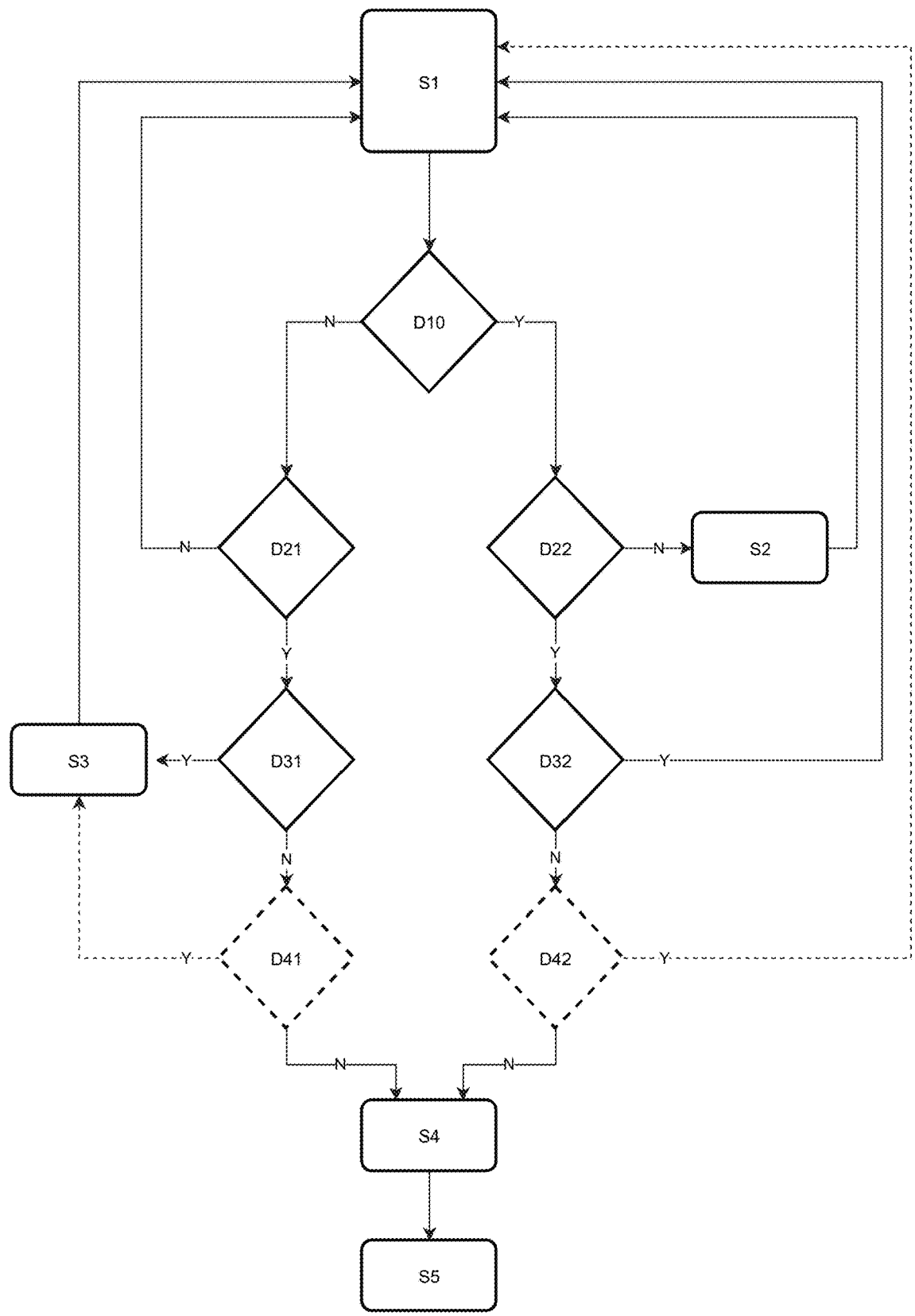
FIG. 3 is a flow chart of a method according to at least one other exemplary embodiment of the present invention.

FIG. 3 illustrates at least one other exemplary embodiment of the method for controlling a remotely operated vehicle (e.g., remotely operated vehicle 10) according to the present disclosure. The method may comprise five major steps S1-S5 and seven decision points steps D10, D21, D22, D31, D32, D41, D42 which determine the order in which the major steps are performed. Steps D41 and D42 are optional.

Similarly, to the embodiment illustrated in FIG. 2, step S1 consists in monitoring a (round-trip) latency of the communication link 14 between the remotely operated vehicle 10 and the remote operation station 12. In one alternative, monitoring the latency is performed by a control unit of the vehicle 10, e.g., control unit 16. This step may advantageously be performed continuously and in parallel with subsequent steps of the method. Step S2 consists in requesting an emergency stop maneuver, e.g., a control unit of the vehicle 10, e.g., control unit 16, sending a request for an emergency stop maneuver to a brake system of the vehicle 10, e.g., brake system 26. Step S3 consists in cancelling the requested emergency stop maneuver.

The method thus starts in step S1. Step D10 answers the question "is the latency above the predetermined threshold?", i.e., latency>T?. The latency threshold may be set according to the same considerations as detailed above in connection with FIG. 2. If the latency is not above the predetermined threshold, the method continues toward step D21; if the latency is above the predetermined threshold, the method continues toward step D22. In both steps D21 and D22, the path forward is determined by whether there is a current request for an emergency stop maneuver. By current emergency stop maneuver, it is meant a request for an emergency stop maneuver that has neither been cancelled not fully carried out. In other words, if there is a current request for an emergency stop maneuver, the vehicle 10 is in the process of performing an emergency stop maneuver. Importantly, if there is a current request for an emergency stop maneuver, the brakes of the vehicle 10 may or may not have engaged and/or the vehicle 10 may or may not have started decelerating, depending on the time elapsed since the emergency stop maneuver was requested.

After step D21, if there is no current request for an emergency stop maneuver, the method goes back to step S1, where the latency of the communication link 14 is monitored. This corresponds to "normal" operation of the remotely operated vehicle 10, i.e., the latency is under the predetermined threshold and no emergency stop maneuver is requested. Conversely, after step D22, if there is no current request for an emergency stop maneuver, an emergency stop maneuver is requested at step S2.

If there is a current request for an emergency stop maneuver at steps D21 and D22, the method continues to steps D31 and D32, respectively. Here, the path forward depends on whether the time elapsed since the emergency stop maneuver was requested is below the brake reaction time. If at D31, where the latency is below the predetermined threshold and there is a current request for an emergency stop maneuver, the time elapsed since the request is below the brake reaction time, the method goes to step S3, in which the request for an emergency stop maneuver is cancelled. Thereafter, the method returns to step S1. If at D32, where the latency is above the predetermined threshold and there is a current request for an emergency stop maneuver, the time elapsed since the request is below the brake reaction time, the method returns to step S1.

If at steps D31 and D32, the time elapsed since the request is not below the brake reaction time, the method may go to optional steps D41 and D42, respectively, or directly to step S4, in which the requested emergency stop maneuver is continued, followed by step S5, in which the requested emergency stop continues to stop the vehicle 10 until the vehicle 10 is stationary.

Optional steps D41 and D42 are similar to steps D31 and D32, except that the time elapsed since the request is compared to the brake reaction time period A plus a second time period B (shown in FIGS. 4c and 4d) corresponding to a delay between the moment the brake system 26 of the vehicle 10 starts slowing the vehicle down and the moment the brake system reaches full braking power. If, at step D41, the time elapsed is below this combined time period (brake reaction time period A plus second time period B), i.e., the communication link 14 is recovered within the second time period B following the brake reaction time period A, the method goes to step S3, in which the request for an emergency stop maneuver is cancelled. Thereafter, the method returns to step S1. Conversely, if, at step D42, the time elapsed is below the combined time period, the method returns to step S1.

If at steps D41 and D42, the time elapsed since the request is not below the combined time period (brake reaction time plus second time period), the method goes to step S4, in which the requested emergency stop is continued. In other words, the requested emergency stop maneuver is continued in response to the communication link 14 not being recovered within the second time period B following the brake reaction time period A.

Returning to FIG. 4a, the plot also exemplifies a possible scenario according to the method described in relation to FIG. 3. In the first part of the plot, the method is in a loop comprising steps S1-D10-D21-S1, i.e., the latency is below the predetermined threshold T and there is no current request for an emergency stop maneuver. At the moment indicated by arrow 100, the method goes to S2 following the steps: S1-D10-D22-S2 and an emergency stop maneuver is requested. Thereafter, until the moment indicated by arrow 200, the method is in the loop S1-D10-D22-D32-S1, i.e., the latency is above the predetermined threshold and there is a current request for an emergency stop maneuver. At arrow 200, the method goes through steps S1-D10-D21-D31. Here, since the latency crossed below the threshold T within the brake reaction time period A, the requested emergency stop maneuver is cancelled in step S3 and the method thereafter goes back to step S1.

Figure 4B:
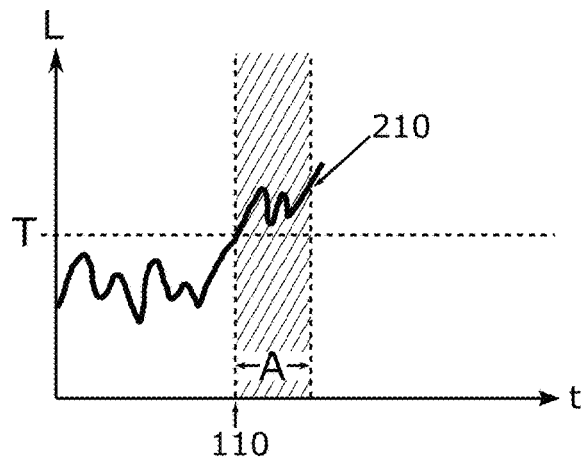

FIG. 4b shows another example plot of the latency L as a function of time t. Here, analogous to FIG. 4a, the latency crossed the predetermined threshold T at the moment indicated by arrow 110. However, the latency stays above the predetermined threshold T throughout the brake reaction time period A, i.e., the plot exits the hatched area above the horizontal dashed line, at the moment indicated by arrow 210. This corresponds to the method following steps S1-D10-D22-D32-S4 in FIG. 3, i.e., the requested emergency stop maneuver is continued, in response to the communication link 14 not being recovered within the brake reaction time period A (step D42 being absent from this scenario).

Figure 4C:
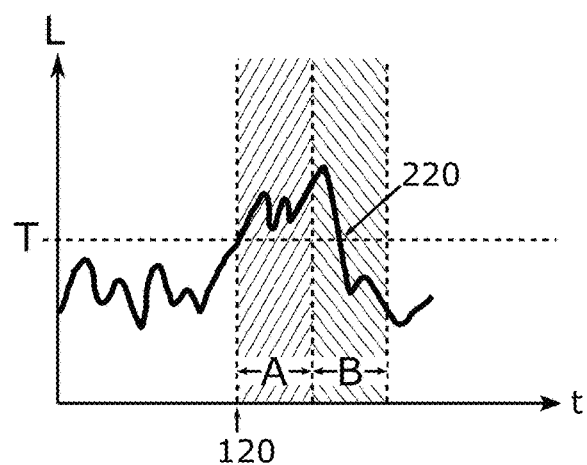

A scenario in which the communication link 14 is recovered within the aforementioned second time period B following the brake reaction time period A is shown in FIG. 4c. As mentioned above, time period B corresponds to a delay between the moment the brake system 26 of the vehicle 10 starts slowing the vehicle 10 down and the moment the brake system 26 reaches full braking power. After an emergency stop maneuver has been requested (step S2 of FIG. 3) at the moment indicated by arrow 120, the plot within the brake reaction time period A corresponds to the method following a loop with steps S1-D10-D22-D32-S1 of FIG. 3. After crossing into the second time period B, the method initially follows a loop with steps S1-D10-D22-D32-D42-S1. At the moment indicated by arrow 220, i.e., when the latency falls back below the predetermined threshold T, the method follows steps S1-D10-D21-D31-D41-S3 and the requested emergency stop maneuver is cancelled. The method then goes back to step S1.

Figure 4D:
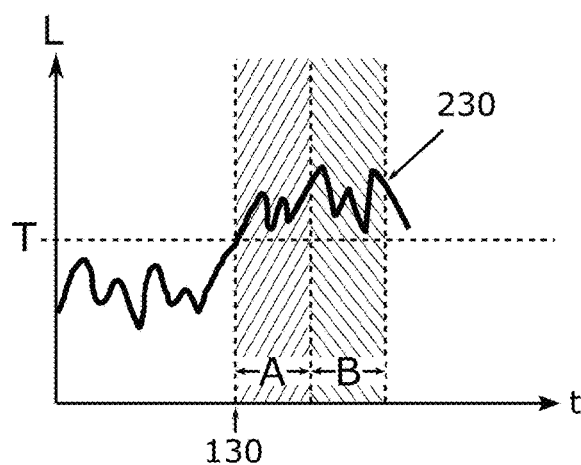

FIG. 4d shows a scenario in which the communication link 14 is neither recovered within the brake reaction time period A nor within the second time period B following the brake reaction time period A. After an emergency stop maneuver has been requested (step S2 of FIG. 3) at the moment indicated by arrow 130, the plot within the brake reaction time period A corresponds to the method following a loop with steps S1-D10-D22-D32-S1 of FIG. 3. After crossing into the second time period B, the method follows a loop with steps S1-D10-D22-D32-D42-S1. At the moment indicated by arrow 230, the plot exits the second time period B with the latency L still above the predetermined threshold T. The communication link 14 is thus not recovered within the second time period B (and obviously was not recovered within the brake reaction time period A). Here, the method goes to step S4 and the emergency stop maneuver is continued. In step S5, the requested emergency stop maneuver continues to stop the vehicle 10 until the vehicle 10 is stationary.

Various embodiments of the invention have been described in detail with reference to the accompanying drawings. References made to particular examples and implementations are for illustrative purposes and are not intended to limit the scope of the invention or the claims.

The ordinarily skilled person in the art realizes that the present invention by no means is limited to the embodiments described above. The features of the described embodiments may be combined in different ways, and many modifications and variations are possible within the scope of the appended claims. The word "comprising" does not exclude the presence of other elements or steps than those listed in the claim. The word "a" or "an" preceding an element does not exclude the presence of a plurality of such elements.

It should be apparent to those skilled in the art that many more modifications of the invention besides those already described are possible without departing from the inventive concepts herein. The inventive subject matter, therefore, is not to be restricted except by the scope of the appended claims. Moreover, in interpreting both the specification and the claims, all terms should be interpreted in the broadest possible manner consistent with the context.

Headings and sub-headings provided herein have been provided as an assistance to the reader and are not meant to limit the scope of the invention disclosed herein. Headings and sub-headings are not intended to be the sole or exclusive location for the discussion of a particular topic.

While specific embodiments of the invention have been illustrated and described, it will be clear that the invention is not limited to these embodiments only. Embodiments of the invention discussed herein may have generally implied the use of materials from certain named equipment manufacturers; however, the invention may be adapted for use with equipment from other sources and manufacturers. Equipment used in conjunction with the invention may be configured to operate according to conventional protocols and/or may be configured to operate according to specialized protocols. Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification but should be construed to include all systems and methods that operate under the claims set forth hereinbelow. Thus, it is intended that the invention covers the modifications and variations of this invention provided they come within the scope of the appended claims and their equivalents.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

I claim:

1. A method of controlling a remotely operated vehicle, the vehicle operated from a remote operation station via a communication link between the vehicle and the remote operation station, the method comprising:
monitoring a latency of the communication link by a control unit in the vehicle,
requesting an emergency stop maneuver of the vehicle by the control unit in response to the latency exceeding a predetermined latency threshold, and
cancelling the requested emergency stop maneuver by the control unit in response to the communication link being recovered within a brake reaction time period of the vehicle starting when the emergency stop maneuver is requested, thereby enabling the remote operation station to set lower predetermined latency thresholds based on the brake reaction time period of the vehicle.

2. The method of claim 1, wherein the predetermined latency threshold is dynamic, such that the predetermined latency threshold varies depending on a current driving scenario.

3. The method of claim 1, wherein the requested emergency stop maneuver is cancelled before the vehicle starts decelerating.

4. The method of claim 1, wherein the brake reaction time period of the vehicle corresponds to a delay between the moment the emergency stop maneuver is requested and the moment a brake system of the vehicle starts slowing the vehicle down.

5. The method of claim 1, wherein the method further comprises:
continuing the requested emergency stop maneuver in response to the communication link not being recovered within the brake reaction time period of the vehicle.

6. The method of claim 5, wherein the requested emergency stop maneuver continues to stop the vehicle until the vehicle is stationary.

7. The method of claim 1, wherein the method further comprises:
cancelling the requested emergency stop maneuver, in response to the communication link being recovered within a second time period following the brake reaction time period of the vehicle,
wherein the second time period corresponds to a delay between a time a brake system of the vehicle starts slowing the vehicle down and a time the brake system reaches full braking power.

8. The method of claim 1, wherein the brake reaction time period is in the range of 150-250 ms.

9. The method of claim 1, wherein requesting an emergency stop maneuver includes a control unit of the vehicle sending a request for an emergency stop maneuver to a brake system of the vehicle.

10. The method of claim 1, wherein the communication link is recovered when the latency falls below the predetermined threshold.

11. The method of claim 1, wherein the communication link is wireless, wherein the latency is round-trip latency, and/or wherein the latency is continuously monitored in the vehicle.

12. The method of claim 1, wherein the vehicle monitors a latency of the communication link, requests an emergency stop maneuver of the vehicle, cancels the requested emergency stop maneuver, and continues the requested emergency stop maneuver.

13. The method of claim 1, wherein operating the vehicle from a remote operation station includes at least one of: an operator of the remote operation station remotely driving the vehicle and an operator of the remote operation station remotely monitoring the vehicle.

14. A remotely operated vehicle configured to be operated from a remote operation station via a communication link between the vehicle and the remote operation station, the vehicle having a control unit comprising at least one processor, wherein the control unit is configured to:
monitor a latency of the communication link,
request an emergency stop maneuver, in response to the latency exceeding a predetermined latency threshold, and
cancel the requested emergency stop maneuver, in response to the communication link being recovered within a brake reaction time period of the vehicle starting when the emergency stop maneuver is requested, thereby enabling the remote operation station to set lower predetermined latency thresholds based on the brake reaction time period of the vehicle.

15. The remotely operated vehicle of claim 14, wherein the predetermined latency threshold is dynamic, such that the predetermined latency threshold varies according to a current driving scenario.

16. The remotely operated vehicle of claim 14, wherein the control unit cancels the requested emergency stop maneuver before the vehicle starts decelerating.

17. The remotely operated vehicle of claim 14, wherein the brake reaction time period of the vehicle corresponds to a delay between the moment the emergency stop maneuver is requested and the moment a brake system of the vehicle starts slowing the vehicle down.

18. The remotely operated vehicle of claim 14, wherein the requested emergency stop maneuver continues in response to the communication link not being recovered within the brake reaction time period of the vehicle.

19. The remotely operated vehicle of claim 14, wherein the requested emergency stop maneuver continues to stop the vehicle until the vehicle is stationary.

20. The remotely operated vehicle of claim 14, wherein the control unit is further configured to:
cancel the requested emergency stop maneuver in response to the communication link being recovered within a second time period following the brake reaction time period of the vehicle, wherein the second time period corresponds to a delay between a time a brake system of the vehicle starts slowing the vehicle down and a time the brake system reaches full braking power.

* * * * *